(12) United States Patent
Chambers et al.

(10) Patent No.: US 12,395,371 B2
(45) Date of Patent: Aug. 19, 2025

(54) SYSTEMS AND METHODS TO AGGREGATE BROADBAND SERVICES AT METER COLLAR

(71) Applicant: Avista Edge, Inc., Spokane, WA (US)

(72) Inventors: Sean Chambers, Spokane, WA (US); David Gregory Schafer, Spokane, WA (US); Mark Wayne Gustafson, Spokane, WA (US); Yossi Har-nov, Parkland, FL (US)

(73) Assignee: Avista Edge, Inc., Spokane, WA (US)

( * ) Notice: Subject to any disclaimer, the term of this patent is extended or adjusted under 35 U.S.C. 154(b) by 315 days.

(21) Appl. No.: 18/143,274

(22) Filed: May 4, 2023

(65) Prior Publication Data

US 2023/0275779 A1 Aug. 31, 2023

Related U.S. Application Data

(63) Continuation-in-part of application No. 17/669,242, filed on Feb. 10, 2022, now abandoned.

(51) Int. Cl.
*H04L 12/28* (2006.01)
*H04B 3/54* (2006.01)
*H04W 16/00* (2009.01)

(52) U.S. Cl.
CPC .......... *H04L 12/2801* (2013.01); *H04B 3/54* (2013.01); *H04W 16/00* (2013.01)

(58) Field of Classification Search
CPC ...... H04L 12/2801; H04B 3/54; H04W 16/00; Y04S 20/30
USPC ........................................................ 370/338
See application file for complete search history.

(56) References Cited

U.S. PATENT DOCUMENTS

| | | | |
|---|---|---|---|
| 10,530,695 B2* | 1/2020 | Cioffi | H04L 47/13 |
| 2007/0147234 A1* | 6/2007 | Walter | H04L 45/24 |
| | | | 370/389 |
| 2012/0052857 A1* | 3/2012 | Kumar | H04W 24/08 |
| | | | 455/466 |
| 2015/0016260 A1* | 1/2015 | Chow | H04L 47/762 |
| | | | 370/235 |

(Continued)

OTHER PUBLICATIONS

Office Action for U.S. Appl. No. 17/669,242, mailed on Dec. 20, 2023, Schafer, "Wide Area Network (WAN) and Local Area Network (LAN) Aggregator at Utility Service", 40 Pages.

(Continued)

*Primary Examiner* — Kwang B Yao
*Assistant Examiner* — Syed M Bokhari
(74) *Attorney, Agent, or Firm* — Lee & Hayes, P.C.

(57) ABSTRACT

A system includes a consumer premise equipment (CPE) configured to couple to an electric meter at a premise. The CPE includes one or more first antennas and a first broadband over powerline (BPL) interface. The CPE is configured to receive data from a remote device, send, via the first BPL interface, a first portion of the data over electrical wiring of the premise, and send, via the one or more first antennas, a second portion of the data. A router one or more second antennas and a second BPL interface. The router is configured to receive, via the second BPL interface, the first portion of the data, receive, via the one or more second antennas, the second portion of the data, and aggregate the first portion of the data and the second portion of the data to extend broadband services to the premise.

12 Claims, 6 Drawing Sheets

(56) References Cited

U.S. PATENT DOCUMENTS

| | | | | |
|---|---|---|---|---|
| 2015/0230275 A1* | 8/2015 | Kerpez | .............. | H04L 12/2869 |
| | | | | 370/329 |
| 2015/0372907 A1* | 12/2015 | Korhonen | ............... | H04L 45/02 |
| | | | | 370/254 |
| 2021/0297111 A1 | 9/2021 | Schafer et al. | | |
| 2021/0297141 A1 | 9/2021 | Schafer | | |
| 2022/0321604 A1* | 10/2022 | Majumdar | ......... | H04L 63/0227 |
| 2023/0254750 A1 | 8/2023 | Schafer | | |

OTHER PUBLICATIONS

PCT Search Report and Written Opinion mailed Apr. 18, 2023 for PCT application No. PCT/US22/53616, 13 pages.

Office Action for U.S. Appl. No. 17/669,242, mailed on Jul. 6, 2023, Schafer, "Wide Area Network (WAN) and Local Area Network (LAN) Aggregator at Utility Service", 29 Pages.

* cited by examiner

SYSTEMS AND METHODS TO AGGREGATE BROADBAND SERVICES AT METER COLLAR

CROSS REFERENCE TO RELATED APPLICATIONS

This application is a continuation-in-part of, and claims priority to, U.S. patent application Ser. No. 17/669,242, filed Feb. 10, 2022, the entire contents of which are incorporated herein by reference.

BACKGROUND

The proliferation of the Internet has resulted in individuals and business becoming more connected. As a result, the demand for services available on the Internet, and the availability of devices to access the Internet, has increased. However, despite this increase, much of the world may lack access to broadband services (e.g., DSL, cable, fiber-optic, satellite, etc.). This need has forced carriers, providers, and equipment manufacturers to develop high throughput solutions, such as fiber-optic networks, to keep up throughput demands. However, certain premises may be difficult and/or costly to access.

Additionally, some providers utilize wireless technology to deliver high throughput, Internet services. As wireless technology evolves to higher frequencies to increase throughput and capacity, building penetration remains difficult and costly. For example, conventional systems may fail to penetrate structures when wireless signals are attenuated below useful levels.

Future technological improvements may enhance access to broadband services and increase user experiences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. The systems and devices depicted in the accompanying figures are not to scale and components within the figures may be depicted not to scale with each other.

DETAILED DESCRIPTION

Figure 1:
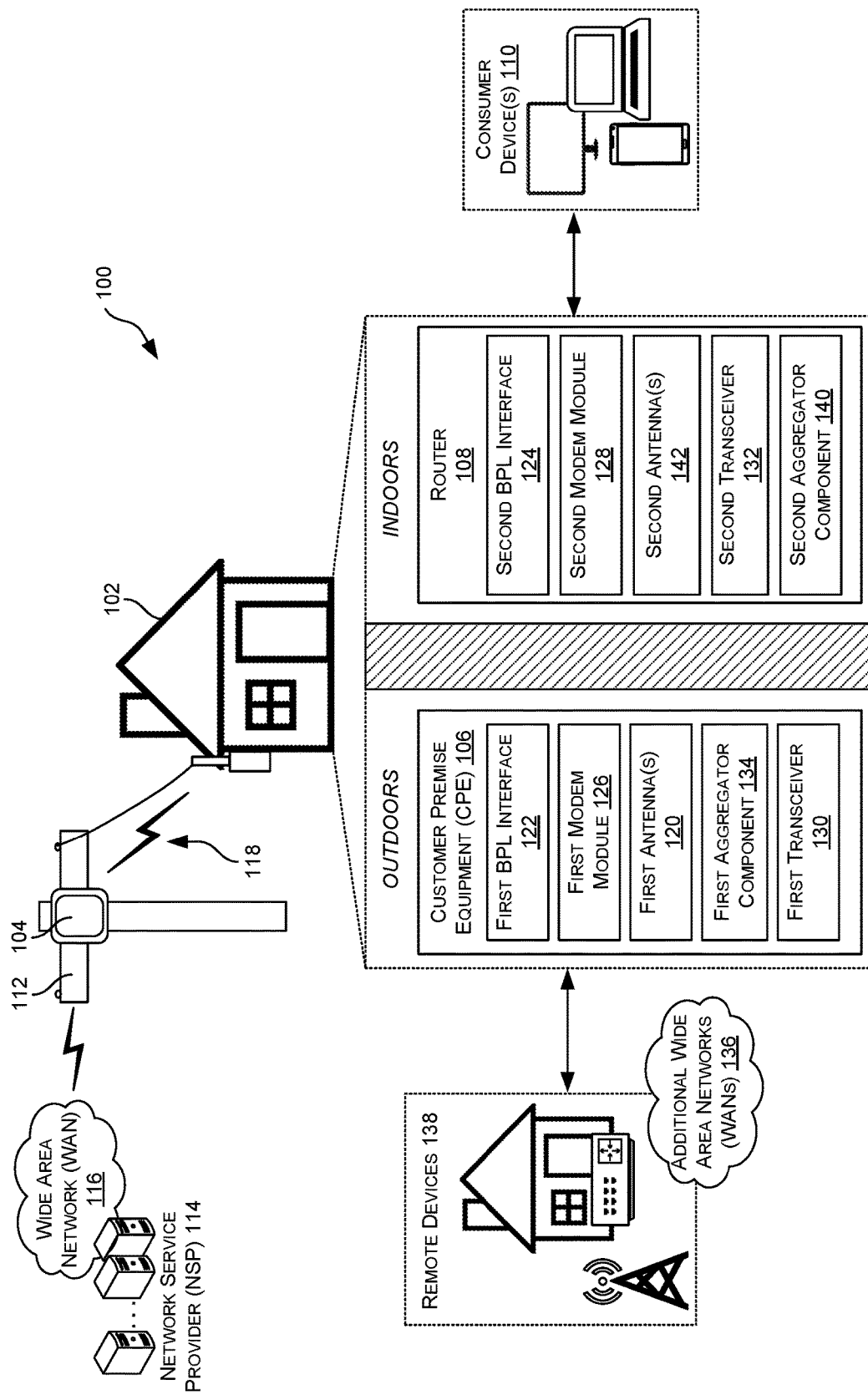
FIG. 1 illustrates an example environment, showing a base station radio device communicating with a customer premise equipment (CPE), and the CPE communicating with a router for extending broadband services to consumer device(s) within a premise, according to an example of the present disclosure.

This application is directed, at least in part, to systems and methods that provide broadband services (e.g., high-speed internet) to premises, such as homes, multi-family units, and/or places of business, using wired and/or wireless connections. In some instances, the systems and methods discussed herein may aggregate broadband services delivered over the wired and/or wireless connections as a way to increase a throughput of broadband services at the premises. For example, the wired connection may utilize Broadband over Power Line (BPL) technology (alternatively referred to a powerline communication (PLC) and/or internet over power line (IPL)) to deliver broadband services of a first throughput into the premises. Utilizing existing electrical wiring of the premise may alleviate the need to build broadband facilities, structures, and/or route cables into individual premises. The wireless connection, using 2.4 GHz and/or 5.0 GHz, for example, may additionally or alternatively be used to deliver broadband services of a second throughput into the premises. In such instances, the system and methods described herein may make use of both wired and wireless connections as a way to aggregate broadband services for an increased throughput at the premises.

In some instances, the systems and methods described herein include a plurality of base station radio devices, customer premise equipment (CPEs), and/or routers. The plurality of base station radio devices may be placed atop vertical structures (e.g., utility poles, streetlights, etc.) and may communicatively connect with the CPEs placed at the premises. The CPEs communicatively connect with the routers located inside the premises, and the routers may generate one or more local area network (LANs) inside the premise. The LANs provide computing device(s) (e.g., computer, television, etc.) within the premises access to broadband services (e.g., the Internet). As will be explained herein, and as introduced above, the CPEs may have both a wired connection and a wireless connection with the routers inside the premises. In such instances, the CPE may extend the broadband services to the routers using both the wired connection via transmitting a conductive signal, and/or the wireless connection via transmitting a (e.g., radio frequency (RF)) signal, respectively.

The base station radio devices may communicatively connect to an internet service provider (ISP), wide area network (WAN), and/or network service provider (NSP) that offers or otherwise provides the broadband services to consumers. In some instances, the base station radio devices may communicatively connect to the NSP via a backhaul network (e.g., fiber-optic, cables) and/or wireless technology (e.g., millimeter wave (mmWave)) technology. However, regardless of the specific implementation, the communication between the base station radio devices and the NSP may represent a high-speed communication path for providing broadband services.

In some instances, the base station radio devices may function as a gateway to extend broadband services to the CPEs (and ultimately, the premise) by wirelessly communicating with the CPEs. To wirelessly communicate with one another, the base station radio devices and the CPEs may include various modems, antenna(s), an array of antennas, transceiver systems, and so forth. In some instances, the antenna(s) of the base station radio devices and/or the antenna(s) of the CPEs may include a plurality of modems and/or antennas for communicating over a range of frequencies (e.g., mid frequencies, high frequencies, etc.). Additionally, the antenna(s) of the base station radio device(s) and/or the antennas of the CPEs may include antennas for any disparate number of communication technologies (e.g., 4G LTE, 5G, etc.). In some instances, the CPEs may include modular components for interchanging modems, antenna(s), and so forth depending on the communication technologies utilized within the system.

The CPEs are installed at the premise of the consumer (e.g., home and/or place of business) and may represent a fixed wireless device. In some instances, the CPEs may be installed on an exterior side of the premises at a demarcation point in which services (e.g., power, phone, television, etc.) are provided into the premise. In some instances, the CPE may be installed within an existing electric meter panel to couple to the electric meter and the electrical wiring of the premise. For example, the CPE may include a housing that fits within an existing electric meter panel. In some instances, when installed, the CPE may be interposed between the electric meter panel and the electric meter. This connection serves to provide power to the CPE, transfer power to the electric meter for metering, and communicatively connects the CPE with (or to) the electrical wiring of the premise. Connecting to the electrical wiring forms the wired connection between the CPE and the router, and allows the CPE to provide wired signals into the premise (e.g., BPL).

In some instances, in addition to communicatively connecting to one or more base station radio device(s), the CPEs may communicatively connect to other devices adjacent to the premise via a wide area network (WAN). For example, the CPEs may communicatively connect to other routers, modems, devices, etc. via cellular (e.g., 3G, 4G, 4G LTE, 5G, etc.), Wi-Fi (e.g., 802.11), and so forth. The CPE may also be in wired connections with one or more networks (e.g., fiber optic, coaxial, etc.). In such instances, the CPEs may be configured to connect to any number of disparate networks (e.g., one, two, three, five, etc.) to receive the broadband services. In such instances, the CPE may aggregate broadband services received via the various networks as a way to increase throughput into the premise. For example, the CPE may include a broadband services aggregator component to aggregate the broadband services received via different networks (or different sources). Accordingly, the CPE may be configured to extend broadband services into the premise via communicatively connecting with base station radio device(s) as well as other devices.

In some instances, the CPE is configured to transmit two signals to the router, such as a wired signal via the wired connection and a wireless signal via the wireless connection, for delivering the broadband services into the premise. For example, a first signal may represent a conductive signal (e.g., g·hn) that is transmitted over the electrical wiring of the premise. A second signal may represent an RF signal (e.g., 2.4 GHz, 5.0 GHz, etc.) that is wirelessly transmitted into the premise. The first signal may deliver a first portion of the broadband services into the premise, while the second signal may deliver a second portion of the broadband services into the premise. Stated alternatively, a first portion of the broadband services provided into the premise is transmitted via the wired connection, while a second portion of the broadband services provided into the premise is transmitted via the wireless connection. For example, the conductive signal may provide a first broadband services speed, such as 100 megabits per second (mbps), while the RF signal may provide a second broadband services speed, such as 25 mbps. As such, by transmitting both signals into the premise, the broadband services may be aggregated to provide speeds up to 125 mbps.

In some instances, the first signal and/or the second signal may be associated with the broadband services received at the CPE via the base station radio device(s). Additionally, or alternatively, the first signal and/or the second signal may be associated with broadband services received from other communicatively connected devices (e.g., WAN). In this manner, the CPE may receive broadband services from any number of disparate sources and may then may provide the broadband services into the premise via two signals.

The two signals transmitted via the CPE are received by the router located within the interior of the premise. The router receives the conductive signal and the RF signal and aggregates the signals to provide broadband services into the premise. Similar to the CPE, the routers may include a broadband services aggregator component that aggregates the broadband services received via the wired connection and the wireless connection with the CPE. For example, the routers may receive the conductive signal from the CPE and the RF signal from the CPE, may aggregate these two signals, and then provide LANs into the premise. In some instances, the routers may provide any number of LANs (whether wired or wireless) into the premises. In some instances, signals may be aggregated based on their speeds, protocols, content (e.g., data), and so forth.

In some instances, the routers may be plugged into an outlet within the interior of the premise and located proximate to the CPE and/or the service panel to reduce dissipation and/or noise transmitted over the wired connection. Additionally, locating the routers close to the CPE may reduce noise transmitted over the wireless connection (e.g., via building penetration). In some instances, the routers and the CPE may be paired with one another as part of an out of box experience (OOBE).

The CPE and the routers may include respective interfaces for communicating with one another. For example, the CPE may include a BPL interface, a modem module coupled to antenna(s), and a transceiver. The BPL interface and the modem module may respectively transmit the conductive signal via the wired connection to the modem. As the antenna(s) of the CPE receives the broadband services from the base station radio device(s), for example, the BPL interface communicates the broadband services to the BPL interface of the router. In some instances, the BPL interface and the modem module (and/or the antenna(s)) may be components of a system on a chip (SoC) of the CPE. Meanwhile, the transceiver of the CPE may transmit the RF signal via the wireless connection to the router. However, as the antenna(s) of the CPE may receive the broadband services from the base station radio device(s), the broadband services aggregator component of the CPE may be responsible for aggregating the broadband services provided to the router. In such instances, the broadband services aggregator component may communicatively connect with the modem module and the transceiver for providing the broadband services via the wired connection and the wireless connection, respectively.

The router, which is located within the interior of the premise, may include a BPL interface for receiving the broadband services from the CPE. The BPL interface of the CPE and the BPL interface of the router therefore allows for the CPE and the router to communicate over the electrical wiring of the premise. The router also includes a transceiver for receiving the RF signals transmitted by the transceiver of the CPE. For example, the transceiver of the CPE may represent an 802.11 embedded device that communicates from outside of the premise to the router located inside the premise. The transceiver of the router may represent an 802.11 embedded device that receives signals from the transceiver of the CPE. Additionally, noted above, the router includes a broadband services aggregator component that aggregates the conductive signal and/or the RF signal as received from the CPE. By aggregating the conductive signal and the RF signal, the CPE is able to provide broadband services into the premise at an increased rate (e.g., speed).

In some instances, the router may further include a wireless modem and antenna(s) for providing one or more LAN network(s) within the premise. In some instances, the antenna(s) of the router may include a Wi-Fi module for supplying the premise with Wi-Fi (e.g., 2.4 GHz Wi-Fi, 5 GHz Wi-Fi, 6 GHz, etc.). The antenna(s) may also be modular or interchangeable to provide additional Wi-Fi frequency bands into the premise. In some instances, the router may deliver wireless and/or wired network(s) inside the premise (e.g., Ethernet, coaxial cable, USB, twisted pair, plastic fiber, etc.). In some instances, the antenna(s), BPL interface, and/or modem of the router may be components of a SoC.

In some instances, the CPE may transmit the conductive signal and/or the RF signal based at least in part on bandwidth capabilities. For example, while the CPE may transmit the conductive signal and the RF signal, the amount of data transmitted over each signal, respectively, may be based on bandwidth capabilities. For example, in some instances, depending on the application and/or the environment, the wired connection and/or wireless connection may have a limited bandwidth to deliver broadband services into the premise. For example, building materials (e.g., stucco, brick, etc.) may restrict the amount of broadband services provided into the premise via the wireless connection. In such instances, the CPE may utilize the wired connection to transmit a greater amount of the broadband services into the premise as compared to the wireless connection.

Additionally, although described as transmitting the wired signal via BPL, the CPE may additionally or alternatively take advantage of other wired connections. For example, fiber optic cables, coaxial cables, and/or Ethernet cables extending between the exterior and interior of the house may be used to provide the wired connection with the router. As such, more than one wired connection (e.g., two wired connections) may exist between the CPE and the router. In such instances, the broadband services aggregator component of the CPE and the router may respectively aggregate the broadband services provided over the different wired signals for providing an increased throughout. Moreover, the same may be true for the wireless connections, and wireless signals of different frequencies may be communicated between the CPE and the router. For example, a first wireless signal (e.g., 2.4 GHz) and a second wireless signal (e.g., 5.0 GHz) may be transmitted between the CPE and the router to increase a throughput of broadband services. Here again, a broadband services aggregator component of the CPE and the router may respectively aggregate the broadband services provided over the different wireless signals for providing an increased throughout.

Accordingly, the systems and methods described herein may be configured to receive broadband services, and in some instances, aggregate the broadband services provided by those sources, and deliver signals into the premise via different connections. For example, a wired connection (e.g., g·hn) may be used to provide a first throughput of broadband services, while a wireless connection (e.g., 2.4 GHz) may be used to provide a second throughput of broadband services. A router, may aggregate the broadband services provided by the different connections with the CPE to provide one or more LAN networks into the premise. The router and the CPE may therefore aggregate different signals (e.g., conductive and wireless) as a way to increase throughput into the premise.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for providing broadband services (e.g., internet) to a premise 102 (e.g., building, house, multi-dwelling complex, etc.) by aggregating broadband services.

In some instances, the environment 100 includes one or more base station radio device(s) 104, one or more customer premise equipment (CPE) 106, one or more router(s) 108, and/or one or more consumer device(s) 110. The base station radio device(s) 104 is shown coupled to structures 112 (e.g., utility pole structures) for being disposed above the ground, or overhead. In some instances, the base station radio device(s) 104 may be configured to mount to the structures 112 to vertically dispose the base station radio device(s) 104 above the ground. For example, the base station radio device(s) 104 may be disposed on a side of a building, a light pole, stop lights, telephone poles, and so forth.

In some instances, the base station radio device(s) 104 may be disposed on the structures 112 for communicatively coupling to a network service provider (NSP) 114 (or other internet service provider (ISP)). In some instances, the NSP 114 may be accessed, for example, via a wide area network (WAN) 116. The WAN 116 connects computers, or other devices, that span a wide geographical area. As explained herein, the WAN 116 provides access to the broadband services (e.g., the Internet), available by the NSP 114, to the consumer device(s) 110 located within the premise 102.

In some instances, a backhaul may connect the base station radio device(s) 104 to the NSP 114, over the WAN 116. The backhaul may, in some instances, include cables (e.g., fiber-optic cables) that span between the structures 112, computers, switches, hubs, and/or devices on the WAN 116, whether wired and/or wirelessly, and which ultimately route to the NSP 114 for extending broadband services into the premise 102. In some instances, the backhaul may route to a middle-mile location with broadband services (e.g., hospital, police station, etc.) before routing to the NSP 114. In some instances, additionally or alternatively, the base station radio device(s) 104 may communicate with the NSP 114 via wireless technologies (e.g., mmWave). However, the backhaul may be routed differently than shown for communicating with the NSP 114. For example, rather than the backhaul being disposed on the structures 112, the backhaul (or portions thereof) may be buried and the base station radio device(s) 104 may connect to the backhaul. As such, it is to be understood that the NSP 114 provides access to the WAN 116 to extend the broadband services.

Regardless of the specific implementation, the base station radio device(s) 104 may be connected to the NSP 114, over the WAN 116, for accessing broadband services provided by the NSP 114. Disposing the base station radio device(s) 104 on the structures 112 utilizes an existing network of vertical structures. Furthermore, discussed herein, disposing the base station radio device(s) 104 on the structures 112, or other vertical structures, may provide an unobstructed transmission path (or reduced obstructed path) between the base station radio device(s) 104 and the CPEs 106, vice versa. That is, disposing the base station radio device(s) 104 atop the structures 112 may increase a line of sight with the CPE 106. Additionally, noted above, in communities that lack the structures 112, the base station radio device(s) 104 may be disposed on other vertical structures, such as light poles.

In some instances, a network of the base station radio device(s) 104 may function to extend broadband services to one or more premises. For example, a first base station radio device may be disposed on a first structure to extend broadband services to one or more first premises, while a second base station radio device may be disposed on a second structure to extend broadband services to one or more second premises. In some instances, the one or more first premises may be the same as, or include some of, the one or more second premises. For example, referring to FIG. 1, the base station radio device 104 may provide broadband services to multiple premises, including the premise 102. However, it is to be understood that more than two base station radio device(s) 104 may be included and any number of base station radio device(s) 104 may be installed for extending broadband services to a geographical region. For example, within densely populated areas, a larger number of base station radio device(s) 104 may be installed per block, radius, mile, etc. as compared to less densely populated areas. In this sense, the system may be scaled as needed depending on demand, usage, and/or throughput requirements.

The base station radio device(s) 104 communicate with nearby CPEs, such as the CPE 106, installed at the premise 102. In some instances, the CPE 106 may be configured to attach as a meter collar within existing electric meters (or panels), which may be a smart meter of the premise 102, on an exterior of the premise 102. For example, the meter collar may include a power module configured to supply power to the CPE 106 and which couples to the electrical wiring of the premise 102 (e.g., as received from power lines spanning between the structures 112). Alternatively, the CPE 106 may attach to the premise 102 at any demarcation point between a utility service and the premise 102 (e.g., electrical panel). As such, coupling the CPE 106 at or within the meter collar of the utility service panel couples the CPE 106 to electrical wiring of the premise 102. Additional details of the meter collar are described in, for example, U.S. Pat. No. 17,202,526, entitled "Modular Customer Premises Equipment for Providing Broadband Internet," issued Oct. 4, 2022, the entirety of which is herein incorporated by reference.

The base station radio device 104 may wirelessly communicate with the CPE 106 to extend broadband services offered by the NSP 114 into the premise 102. In some instances, the base station radio device 104 and the CPE 106 communicate over a communication channel 118, which may support any dynamically shared spectrum (DSS) (e.g. between 3100 MHz and 4200 MHz). In some instances, the communication channel 118 may support the Citizens Broadcast Radio Spectrum (CBRS) between 3550 MHz and 3700 MHz. In some instances, the communication channel 118 may include any low-band, mid-band and/or high-band frequencies, regardless of the DSS. In some instances, the communication channel 118 may represent a 5.0 GHz communication channel. However, it is to be understood that the communication channel 118 may support any range of frequencies for extending broadband services into the premise 102.

The CPE 106 includes first antenna(s) 120 (or a multi-antenna array) for communicating, via the communication channel 118, with the base station radio device 104 and via an antenna of the base station radio device 104 (not shown in FIG. 1.). In some instances, depending on the range of frequencies (or spectrum) at which the base station radio device 104 and the CPE 106 are configured to communicate, the CPE 106 may be configured accordingly. For example, the first antenna(s) 120 may be interchangeable to accommodate for the spectrum, or range of frequencies, at which the base station radio device 104 and the CPE 106 communicate. In such instances, components of the CPE 106 may be modular or configurable to change antennas, modems, interfaces, and so forth. Multiple antennas, or antenna housings, may be configured to attach to the CPE 106. Such configuration may make the CPE 106 modifiable to accommodate new technologies and communication protocols.

As an example, the CPE 106 may include, or the first antenna(s) 120 of the CPE 106 may represent, a multi-antenna array having antennas (e.g., two, three, four, etc.). In some instances, the first antenna(s) 120 may be arranged with different polarizations. The first antenna(s) 120 may include sub-arrays having multiple patches or elements (e.g., two). In some instances, each sub-array of the multi-antenna array may include two or more orthogonally polarized elements and each element of the sub-array may include a dedicated antenna feed port. By selecting specific polarizations, and determining the phase and or amplitude of the antenna feeds, the first antenna(s) 120 may have a radiation pattern with a predetermined variable polarization. Additional details of polarization for increasing diversity is described in, for example, U.S. patent application Ser. No. 17/202,526, entitled "Modular Customer premise equipment for Providing Broadband Internet," filed Mar. 3, 2021, the entirety of which is herein incorporated by reference.

The CPE 106 includes one or more interface(s) for communicatively connecting with the router 108 and extending the broadband services to the consumer device(s) 110. In some instances, the interfaces communicatively connects the CPE 106 and the router 108 over the electrical wiring of the premise 102 for extending broadband services to the consumer device(s) 110 within the premise 102. (e.g., personal computer, laptop, television, printer, audio/video receiver, audio equipment, video equipment, mobile devices, tablets, etc.). For example, the CPE 106 is shown including a first BPL interface 122 for communicating with a second BPL interface 124 of the router 108. The BPL interfaces allow the CPE 106 and the router 108 to communicate over the electrical wiring of the premise 102 for communicatively coupling the consumer device(s) 110 to the NSP 114.

For example, the first BPL interface 122 may communicatively connects to the first antenna(s) 120 for receiving broadband services, signals, or data via the base station radio device(s) 104. The first BPL interface 122 may then transmit the broadband services, signals, or data to the second BPL interface 124 of the router 108. In some instances, the first BPL interface 122 communicatively connects to a first modem module 126 for communicating with the second BPL interface 124. Correspondingly, the router 108 may also include a second modem module 128 that communicatively connects to the second BPL interface 124.

In addition to the BPL interfaces, the CPE 106 may include a first transceiver 130 for communicating with a second transceiver 132 of the router 108. The first transceiver 130 and the second transceiver 132 act to wirelessly receive and transmit broadband services, signals, or data between the CPE 106 and the router 108. In some instances, the CPE 106 may transmit data to the router 108 over a WAN/WAN using unlicensed spectrum (e.g. 5 Ghz, 2.4 Ghz, etc.). In some instances, the first transceiver 130 may communicatively connect to the first antenna(s) 120 and/or the first modem module 126 for transmitting and receiving broadband services, signals, or data from the second transceiver 132. Here, the second transceiver 132 may communicatively connect to the second modem module 128 for transmitting and receiving broadband services, signals, or data. For example, the first transceiver 130 of the CPE 106 may represent an 802.11 embedded device that wirelessly communicates with router 108 located inside the premise 102. The second transceiver 132 of the router 108 may represent an 802.11 embedded device that receives signals from the first transceiver 130 of the CPE 106.

The CPE 106 is shown including a first aggregator component 134 that may be configured to aggregate broadband services provided to or available at the premise 102. The first aggregator component 134 may aggregate broadband services that are received via wired connections and/or wireless connections with the router 108. For example, the first aggregator component 134 may aggregate broadband services that are received at the first BPL interface 122 and via the electrical wiring of the premise 102 (from the second BPL interface 124), and/or broadband services received at the first transceiver 130 (from the second transceiver 132). In some instances, the first transceiver 130 may transmit (using the first antenna(s) 120 and/or the first modem module 126), broadband services to the to the second transceiver 132 (using second antenna(s) 142 and/or the second modem module 128).

In some instances, the first aggregator component 134 is configured to aggregate the broadband services received from the different communication technologies. By aggregating the broadband services, the CPE 106 may provide the premise 102 with an increased throughput of broadband services. For example, in some instances, the first aggregator component 134 may aggregate broadband services received over disparate spectrums, frequencies, or communication protocols. For example, the CPE 106 may aggregate the WAN 116 received via the base station radio device 104 and/or other additional WANs 136 provided by remote devices 138. For example, FIG. 1 illustrates that the additional WANs 136 may be provided from adjacent premises, cellular towers, or the remote devices 138. As multiple networks may be received at the CPE 106, the first aggregator component 134 may effectuate to aggregate the networks to provide an increased throughput of the broadband services into the premise 102. Once the broadband services are aggregated, the CPE 106 may provide the broadband services to the router 108 via one or more conductive signal(s) (e.g., between the first BPL interface 122 and the second BPL interface 124) and/or one or more RF signal(s) (e.g., between the first transceiver 130 and the second transceiver 132).

In this sense, a portion of the broadband services supplied into the premise 102 may come by way of the electrical wiring of the premise 102, through the conductive signal provided by the first BPL interface 122 and the second BPL interface 124, while another portion of the broadband services may come by way of the RF signal provided by the first transceiver 130 and the second transceiver 132. To aggregate the broadband services at the router 108, the router 108 may include a second aggregator component 140. The second aggregator component 140 may aggregate the broadband services received via the conductive signal(s) and the RF signal(s). As such, the CPE 106 and the router 108 may transmit both conductive signals and RF signals as a way to increase throughput into the premise 102.

The consumer device(s) 110 may have corresponding antenna(s) to communicate with the second antenna(s) 142 of the router. The router 108 may include a Wi-Fi module to supply Wi-Fi into the premise 102. The router 108, however, may be configured to provide Wi-Fi other than 2.4 GHz and 5.0 GHz (e.g., Near Field Communication (NFC)). Additionally, or alternatively, in some instances, the router 108 may broadcast the broadband services to the consumer device(s) 110 via wired technologies such as Ethernet, USB, coaxial, fiber optic, and the like. In such instances, the router 108 may include plug-ins for receiving the wired technologies.

In some instances, the router 108 may represent a wall plug-in or device that otherwise plugs into a power outlet within the premise 102. The router 108 may receive power, via the power outlet, and ultimately via the electrical wiring of the premise 102. As the CPE 106 couples to the electrical wiring of the premise 102, via coupling to the electric meter, the CPE 106 may communicate with the router 108 over the electrical wiring within the premise 102. For example, a meter collar of the CPE 106 may couple the CPE 106 with the neutral, earth ground wires and/or the line voltage wires that are fed into the premise 102 (or which feed into the breaker box of the premise 102). Once the router 108 is plugged in, the CPE 106 may communicate with the router 108 using the electrical wiring (e.g., wires). The BPL interfaces of the CPE 106 and the router 108, respectively, decipher, interpret, and communicate with one another for transmitting and receiving data. In some instances, the CPE 106 and the router 108 may be paired together as part of an installation process in order to provide the broadband services.

In some instances, the CPE 106 or the first antenna(s) 120 may be configured to beam-form for achieving optimum link properties with the base station radio device(s) 104 or the additional WANs 136 (or devices, systems, etc.). In some instances, the beam-forming may be achieved by using an antenna array or a multiple input multiple output (MIMO) antenna. Additionally, while one pathway of communication is described, it is to be understood that the router 108 may similarly communicate with the CPE 106 for transmitting data from the router 108 to the CPE 106, from the CPE 106 to the base station radio device 104, and/or from the CPE 106 to the additional WANs 136.

Figure 2:
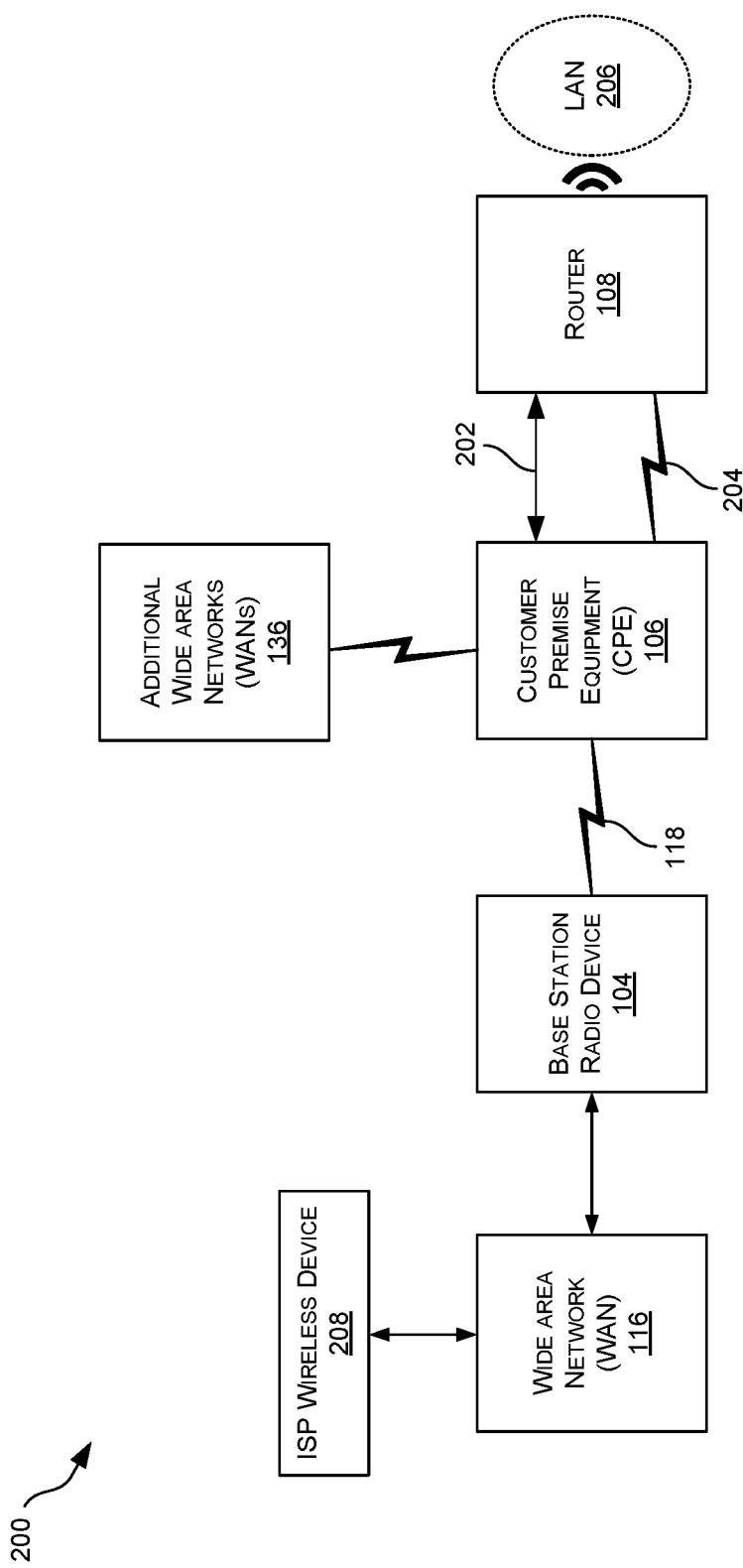
FIG. 2 illustrates an example diagram for providing broadband services to a premise, using conductive signal(s) and radio frequency (RF) signal(s), according to an example of the present disclosure.

FIG. 2 illustrates an example diagram 200 for providing broadband services into the premise 102. As discussed above, the CPE 106 may be disposed on an exterior of the premise 102 while the router 108 may be disposed on an interior of the premise 102. The CPE 106 communicatively connects to the router 108 via a wired or conductive signal 202 (e.g., through the first BPL interface 122 and the second BPL interface 124) and a wireless or RF signal 204 (e.g., through the first transceiver 130 and the second transceiver 132).

The CPE 106 is shown communicatively connected to the base station radio device 104 via the communication channel 118 for communicatively coupling to the WAN 116. The communication channel 118 between the base station radio device 104 and the CPE 106 may represent a wireless signal or wireless communication pathway. Additionally, the CPE 106 may communicatively connect to the additional WANs 136. Such communication may be wireless and/or wired. That is, as noted above, the CPE 106 may wirelessly connect to the additional WANs 136, in addition to the WAN 116 provided by the NSP 114.

Further, as introduced above, the CPE 106 may aggregate the broadband services provided via the WAN 116 and/or the additional WANs 136. For example, the CPE 106 may receive broadband services from the additional WANs 136 and may aggregate these broadband services with broadband services from the WAN 116. The first aggregator component 134 of the CPE 106, for example, may aggregate the broadband services. In some instances, the first aggregator component 134 may correspond to, or the CPE 106 may include, a multi-WAN router (MWR). Additionally, the first aggregator component 134 of the CPE 106 may aggregate broadband services received across a plurality of frequencies (e.g., 5.0 GHz, 2.4 GHz, 4G LTE, etc). For example, the CPE 106 may receive first broadband services or data over a first frequency and second broadband services or data over a second frequency, and aggregate such broadband services. Of course, the CPE 106 may also aggregate the broadband services received via the base station radio device 104.

After aggregating the broadband services, the CPE 106 may transmit the conductive signal 202 using a wired connection with the router 108, and/or the RF signal 204 using a wireless connection with the router 108. For example, the CPE 106 may transmit a first portion of the broadband services to the router 108 via the conductive signal 202 and a second portion of the broadband services to the router 108 via the RF signal 204. In some instances, the CPE 106 may transmit the first portion of the broadband services via the conductive signal 202 and/or the second portion of the broadband services via the RF signal 204 based at least in part on a bandwidth of the wired connection and the wireless connection, respectively. For example, if building penetration is untenable, the CPE may transmit a greater portion of the broadband services to the router 108 via the conductive signal 202. Moreover, in some instances, the CPE 106 may transmit multiple conductive signals 202 (e.g., BPL, Ethernet, etc.) and/or multiple RF signals 204 (e.g., 2.4 Ghz, 5 Ghz, etc.). As such, the CPE 106 may transmit multiple signals to the router 108 as a way to increase a throughput of broadband services into the premise 102.

Inside the premise 102, in some instances, the router 108 aggregates the conductive signal 202 and the RF signal 204. For example, the second aggregator component 140 of the router 108 may receive the conductive signal 202 and the RF signal 204 and combine the conductive signal 202 and the RF signal 204 to provide one or more networks into the premise 102. This network, as shown in FIG. 2, may be a LAN 206 (e.g., Wi-Fi, 2.4 GHz, 5.0 GHz, NFC, etc.) to which the consumer device(s) 110 are able to communicatively connect. In some instances, the router 108 may provide multiple networks to the premise 102, whether wirelessly or wired.

In some instances, rather than wirelessly receiving broadband services via the base station radio device 104, the CPE 106 may wirelessly connect to an ISP wireless device 208, or wireless services. Additionally, although the CPE 106 is describe as aggregating multiple wireless WAN, the CPE 106 may aggregate other WANs provided by other communication technologies. For example, the additional WANs 136 may come by way of coaxial cables, twisted pair cables, fibers, and so forth. In this sense, the CPE 106 may represent a hub that is utilized aggregate the additional WANs 136, whether the additional WANs 136 are wired or wireless, for providing the conductive signal 202 and/or the RF signal 204 into the premise 102.

Figure 3:
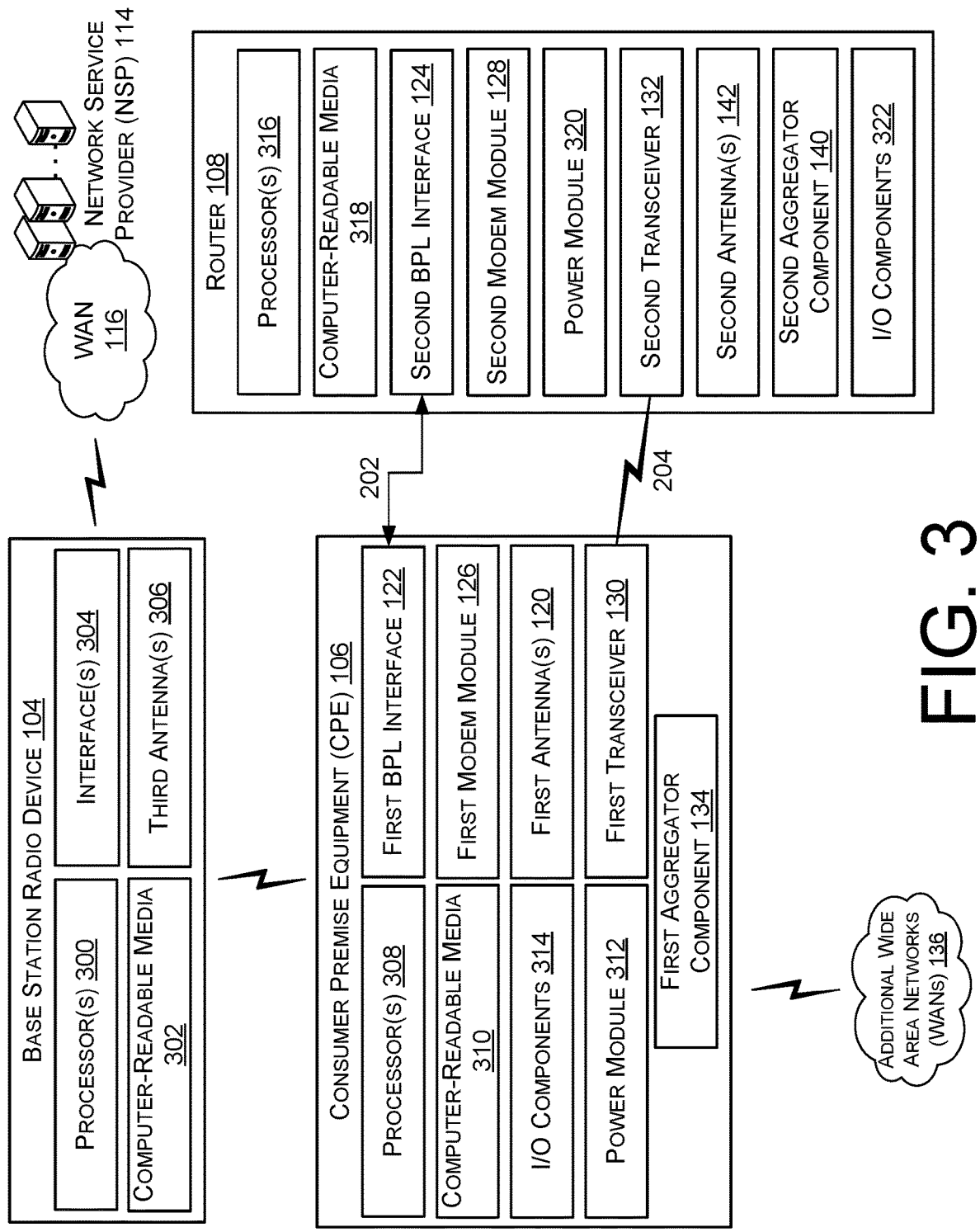
FIG. 3 illustrates example computing components of the base station radio device, the CPE, and the router of FIG. 1, according to an example of the present disclosure.

FIG. 3 illustrates example components of the base station radio device 104, the CPE 106, and the router 108. Discussed above, the base station radio device 104 may be in communication via wired technologies (e.g., a fiber-optic cable network) and/or wireless technologies (e.g., mmWave) with the NSP 114, or the WAN 116 provided by the NSP 114.

The base station radio device 104 may include one or more processor(s) 300, computer-readable media 302, interface(s) 304, and/or third antenna(s) 306. The processor(s) 300 may include a central processing unit (CPU), a graphics processing unit (GPU), both a CPU and a GPU, or other processing units or components. Additionally, each of the processor(s) 300 may possess its own local memory, which also may store program modules, program data, and/or one or more operating systems.

The processor(s) 300 may be coupled to the computer-readable media 302 and execute computer executable instructions stored in the computer-readable media 302. The processor(s) 300 may also couple modules and components of the base station radio device 104 to one another and may perform various functions including instructing and causing the modules and components of the base station radio device 104 to perform their associated functions. For example, the processor(s) 300 may cause components of the base station radio device 104 to transmit and receive broadband services from the NSP 114, as well as transmit and receive broadband services from the CPE 106.

As the base station radio device 104 may communicatively connect to multiple CPEs 106 to provide broadband services, the base station radio device 104 may store, in the computer-readable media 302, indicators and/or identifying information of individual CPEs 106. Such information may be utilized for communicating (e.g., routing) with respective CPEs 106 at a respective premise 102. For example, a particular base station radio device 104 may provide broadband services to multiple premises. As the base station radio device 104 extends broadband services to respective premises, or receives data from the respective premises, the base station radio device 104 may tag or otherwise mark outgoing and incoming broadband services. This marking may indicate which premise is the recipient and/or originator of the broadband services. As such, the base station radio device 104 may transmit the broadband services to the respective premises, or to the proper recipients.

The interface(s) 304 connect the base station radio device 104 to the NSP 114 (e.g., via the fiber-optic broadband network) for accessing broadband services. Additionally, the interface(s) 304 may connect the base station radio device 104 to the CPE 106. For example, the interface(s) 304 may be coupled to the processor(s) 300 and the third antenna(s) 306 for communicating with the CPE 106 (and/or a plurality of CPEs 106) to provide broadband services. In some instances, the interface(s) 304 may include modems, modules, or other components for wirelessly coupling with the CPE 106. For example, the interface(s) 304 may include a DSS modem module, a CBRS modem module, C-band modem module, a WWAN modem module, and/or any other modem/module for communicating, via the communication channel 118, with the CPE 106 (e.g., mid frequencies, high frequencies, etc.). The base station radio device 104 may therefore include a plurality of interface(s) 304 for communicating with corresponding interfaces (e.g., the first modem module 126) of the CPE 106.

In some instances, the interface(s) 304 may include interfaces for interacting with WANs, cellular networks, and so forth. The third antenna(s) 306 may include an array of antennas for otherwise transmitting data to, and receiving data from, the CPE 106. In some instances, the third antenna(s) 306 may beam-form for achieving optimum link properties with the CPE 106 and/or the NSP 114. The base station radio device 104 may include additional interface(s) for communicating with other base station radio device(s) 104 (and ultimately the NSP 114) using wired and/or wireless technologies. Additionally, the third antenna(s) 306 may be capable of receiving signals with varying polarizations from the CPE 106 (e.g., vertical, horizontal, elliptical, etc.).

In some instances, the base station radio device 104 may include input/output (I/O) components coupled to the processor(s) 300. The I/O components may be configured to communicate with a computing device, such as a computing device loaded with appropriate applications for programming or checking the status of the base station radio device 104. For example, the computing device may be operated by a utility service or company providing the broadband services into the premise 102, and which is used for monitoring and/or troubleshooting issues experienced by the base station radio device 104 and/or the CPE 106. The I/O components may also provide other information from the premise 102, such as usage data, data generated by appliances within the premise 102 (e.g., IoT), for use in energy savings, system management, and/or load to service determination.

The base station radio device 104 communicatively connects to the CPE 106 via the communication channel 118. As shown, the CPE 106 may include one or more processor(s) 308, computer-readable media 310, the first antenna(s) 120, the first BPL interface 122, and the first modem module 126, as discussed above with regard to FIG. 1. In some instances, the processor(s) 308 may include a CPU and/or a GPU. Additionally, the processor(s) 308 may possess its own local memory, which also may store program modules, program data, and/or one or more operating systems. The processor(s) 308 may be coupled to the computer-readable media 310 and execute computer executable instructions stored in the computer-readable media 310.

The processor(s) 308 may be also coupled modules and components of the CPE 106 and may perform various functions including instructing and causing the modules and components of the CPE 106 to perform their associated functions. For example, the processor(s) 308 may cause components of the CPE 106 to send and receive broadband services to and from the base station radio device 104, and to send and receive broadband services to and from the router 108. For example, as the first antenna(s) 120 receive broadband services from the base station radio device 104, via the communication channel 118, the processor(s) 308 may cause the broadband services to be sent to the router 108 via the first BPL interface 122. Such transmission may occur via the conductive signal 202, between the first BPL interface 122 and the second BPL interface 124. For example, the first BPL interface 122 of the CPE 106 is shown communicating with the second BPL interface 124 of the router 108. A communication channel exists between the first BPL interface 122 and the second BPL interface 124, representative of the conductive signal 202. Noted above, this communication channel may represent a communication channel over the electrical wiring of the premise 102, whereby the broadband services are transmitted over wires or other cables within the premise 102.

In some instances, the first BPL interface 122 communicatively connects to the first modem module 126 and the second BPL interface 124 communicatively connects to the second modem module 128. The first modem module 126 may include a corresponding module for communicating with the interface(s) 304 of the base station radio device 104 (e.g., DSS, CBRS, G.hn, WWAN, C-band, etc.). As the first modem module 126 receives broadband services, via the first antenna(s) 120, the first modem module 126 may interpret the broadband services. The first BPL interface 122 then transmits the broadband services to the second BPL interface 124, whereby the second modem module 128 may interpret the broadband services.

Additionally, the first transceiver 130 may transmit the broadband services to the second transceiver 132 of the router 108. Such transmission may occur via the RF signal 204, between the first transceiver 130 and the second transceiver 132. A communication channel exists between the first transceiver 130 and the second transceiver 132, representative of the RF signal 204, and the CPE 106 and the router 108 may wirelessly communicate with one another. In some instances, the first transceiver 130 communicatively connects to the first modem module 126 and the second transceiver 132 communicatively connects to the second modem module 128. As the first modem module 126 receives broadband services, via the first antenna(s) 120 and the additional WANs 136, the first modem module 126 may interpret the broadband services. The first transceiver 130 then transmits the broadband services to the second transceiver 132, whereby the second modem module 128 may interpret the broadband services. The processor(s) 308 may therefore route broadband services from the first antenna(s) 120 to interfaces of the CPE 106, and vice versa, for communicatively coupling with the router 108

Additionally, as the first antenna(s) 120 receive broadband services from the additional WANs 136 and via the remote devices 138, the first aggregator component 134 may aggregate the additional WANs 136, with broadband services received via the base station radio device 104, and the processor(s) 308 may cause the broadband services to be aggregated.

As the router 108 receives the broadband services from the CPE 106, the router 108 may provide the one or more LANs (e.g., the LAN 206) to the premise 102. For example, the router 108 may include the second aggregator component 140 that aggregates the broadband services received via the conductive signal 202 and the broadband services receive via the RF signal 204. In some instances, the second aggregator component 140 may communicatively connect to the second modem module 128 in order to provide the LANs via the second antenna(s) 142. In some instances, the second modem module 128 may represent a 2.4 GHz and/or 5.0 GHz Wi-Fi module communicatively connects to the second BPL interface 124.

Although the first BPL interface 122, the first modem module 126, and the first transceiver 130 are shown as separate components, in some instances, the first BPL interface 122, the first modem module 126, and/or the first transceiver 130 may be integrated as a single component. In some instances, the first BPL interface 122, the first modem module 126, and/or the first transceiver 130 may be components of a SoC. Noted above, the first modem module 126 may also be modular and interchangeable depending on the frequencies which the first modem module 126 communicates with the base station radio device 104 and/or the additional WANs 136. Additionally, or alternatively, the second BPL interface 124, the second modem module 128, and/or the second transceiver 132 may be integrated as a single component. In some instances, the second BPL interface 124, the second modem module 128, and/or the second transceiver 132 may be components of a SoC. The second modem module 128 may also be modular and interchangeable depending on the network provided into the premise 102.

The CPE 106 includes a power module 312 coupled to the processor(s) 308. The power module 312 may be coupled to the electric meter of the premise 102 to supply electrical power from the electric meter to some or all components and modules of the CPE 106. The CPE 106, or a housing of the CPE 106 may be configured to attach as a meter collar to the electric meter. Coupling the CPE 106 to the electric meter in this manner also communicatively connects the first BPL interface 122 with the second BPL interface 124 via the electrical wiring of the premise 102. In this sense, the power module 312 may tap into the electrical wiring of the premise 102 for sending broadband services through the wiring of the premise 102, for delivery to the router 108. Using this form of communication allows broadband services to penetrate the premise 102 using existing wiring networks and alleviates the building penetration problem. Examples of coupling the CPE 106 to electric meter are discussed in, for example, U.S. patent application Ser. No. 17/202,526, the entirety of which is herein incorporated by reference.

The CPE 106 may additionally include input/output (I/O) components 314 coupled to the processor(s) 308. The I/O interface components 314 may be configured to communicate with a programming device, such as a computing device of the utility service, or other device loaded with appropriate applications for programming or checking the status of the CPE 106 (or the broadband services). This communication may provide for testing, system upgrades, reboots, and so forth. The communication may also include data from an IoT within the premise 102 for use in load to service determination, energy savings, system usage, and so forth. In such instances, a user interface (UI) may be provided for interfacing with the CPE 106. In some instances, the I/O components 314 may comprise a connector, such as a telco connector, a USB connector, a RJ45 connector, and the like, and/or an RF communication module such as a NFC, Bluetooth communication, or Wi-Fi communication module for such communication.

The router 108 may include one or more processor(s) 316, computer-readable media 318, and the second BPL interface 124, the second modem module 128, and the second aggregator component 140 as discussed above with regard to FIG. 1. In some instances, the processor(s) 316 may include a CPU and/or a GPU. Additionally, the processor(s) 316 may possess its own local memory, which also may store program modules, program data, and/or one or more operating systems. The processor(s) 316 may be coupled to the computer-readable media 318 and execute computer executable instructions stored in the computer-readable media 318. The processor(s) 316 also be coupled to modules and components of the router 108 and may perform various functions including instructing and causing the modules and components of the router 108 to perform their associated functions.

The router 108 includes a power module 320 coupled to the processor(s) 316. The power module 320 may be coupled to a power supply of the premise 102 (e.g., the electrical wiring) and receive electrical power to power components and modules of the router 108. Coupling the router 108 to the electrical wiring in this manner couples the second BPL interface 124 with the first BPL interface 122 via electrical wiring of the premise 102.

In some instances, the router 108 may include input/output (I/O) components 322 coupled to the processor(s) 316. The I/O components 322 may be configured to communicate with a computing device, such as a computing device loaded with appropriate applications for programming or checking the status of the router 108. For example, the computing device may be operated by a utility service providing the broadband internet into the premise 102, and which is used for monitoring and/or troubleshooting issues experienced by the base station radio device 104 and/or the CPE 106. Discussed above, the router 108 includes the second antenna(s) 142 for broadcasting the broadband services within the premise 102. Additionally, or alternatively, the router 108 may include plug-ins (e.g., Ethernet) for coupling to the consumer device(s) 110.

As used herein, a processor, such as the processor(s) 300, 308, and/or 316 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Computer-readable media, such as the computer-readable media 302, 310, and/or 318 may include volatile and non-volatile memory, removable and non-removable media implemented in any method or technology for storage of information, such as computer-readable instructions, data structures, program component, or other data. Such memory may include, but is not limited to, RAM, ROM, EEPROM, flash memory or other memory technology (e.g., embedded Multi-Media Controller (eMMC), SPI NOR), CD-ROM, digital versatile disks (DVD) or other optical storage, magnetic cassettes, magnetic tape, magnetic disk storage or other magnetic storage devices, RAID storage systems, DDR-SDRAM or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 4:
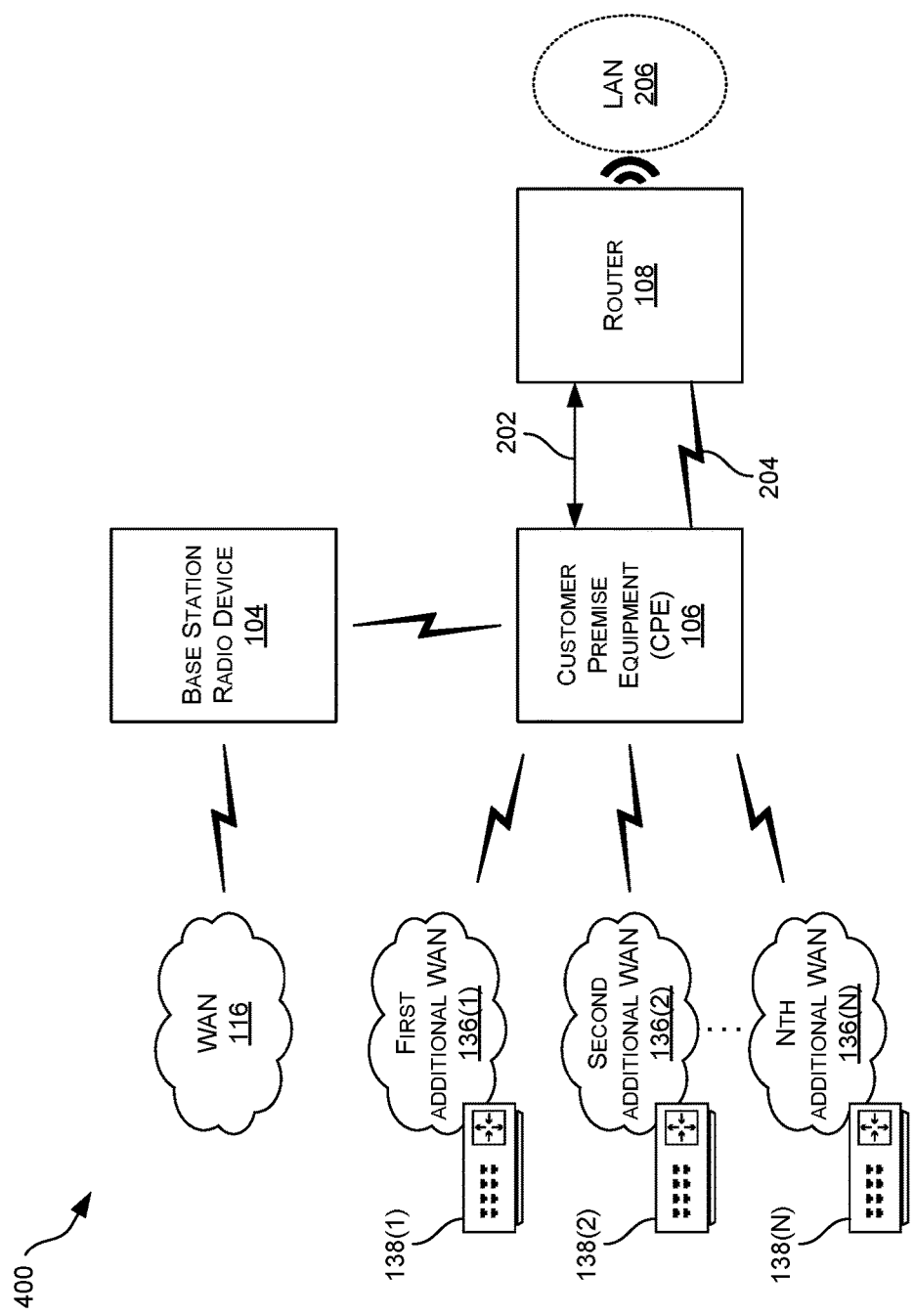
FIG. 4 illustrates an example diagram for aggregating one or more networks for providing conductive signal(s) and/or radio frequency (RF) signal(s), according to an example of the present disclosure.

FIG. 4 illustrates an example diagram 400 for aggregating multiple networks as a way to increase broadband services provided into the premise. As shown, the base station radio device 104 provides the CPE 106 with access to the WAN 116. Additionally, the CPE 106 has access to a first additional WAN 136(1), a second additional WAN 136(2), up to an nth additional WAN 136(N). These additional WANs 136(1)-(N) may be provided by the remote devices 138, which in some instances, represent devices, computers, servers, switches, and so forth in surrounding buildings, residences, and so forth. For example, the first additional WAN 136(1) may be provided by a first device 138(1), the second additional WAN 136(2) may be provided by a second device 138(2), and the nth additional WAN 136(N) may be provided by a $n^{th}$ device 138(N). The devices 138(1)-(N) may be routers, modems, switches, and the like.

The additional WANs 136(1)-(N) may be within range of the CPE 106, and the CPE 106 may take advantage of the additional WANs 136(1)-(N) to provide an increased throughput of broadband services into the premise 102. In some instances, the additional WANs 136(1)-(N) may be 802.11. However, the additional WANs 136(1)-(N) may be any 802.11 protocol (e.g., 802.11ac). Additionally, the CPE 106 may communicatively connect to other networks, whether wirelessly or via wired connections.

In some instances, the CPE 106 is configured to aggregate the WAN 116 and/or the additional WANs 136(1)-(N) for providing the conductive signal 202 and/or the RF signal 204 into the premise 102. For example, using the first aggregator component 134, the CPE 106 may aggregate wireless, infrared (IR), DSL, or RF signals associated with the additional WANs 136(1)-(N). In some instances, the CPE 106 is configured to aggregate broadband services from any number of networks from any number of desperate sources as a way to increase broadband services at the premise 102. In some instances, the amount of broadband services provided via the conductive signal 202 and/or the RF signal 204 may be based on specifics of the premise 102. After aggregating, the CPE 106 transmits the conductive signal 202 and/or the RF signal 204 to the router 108. Therein, the router 108, using the second aggregator component 140, for example, aggregates the conductive signal 202 and/or the RF signal 204 to broadcast the LAN 206.

Figure 5:
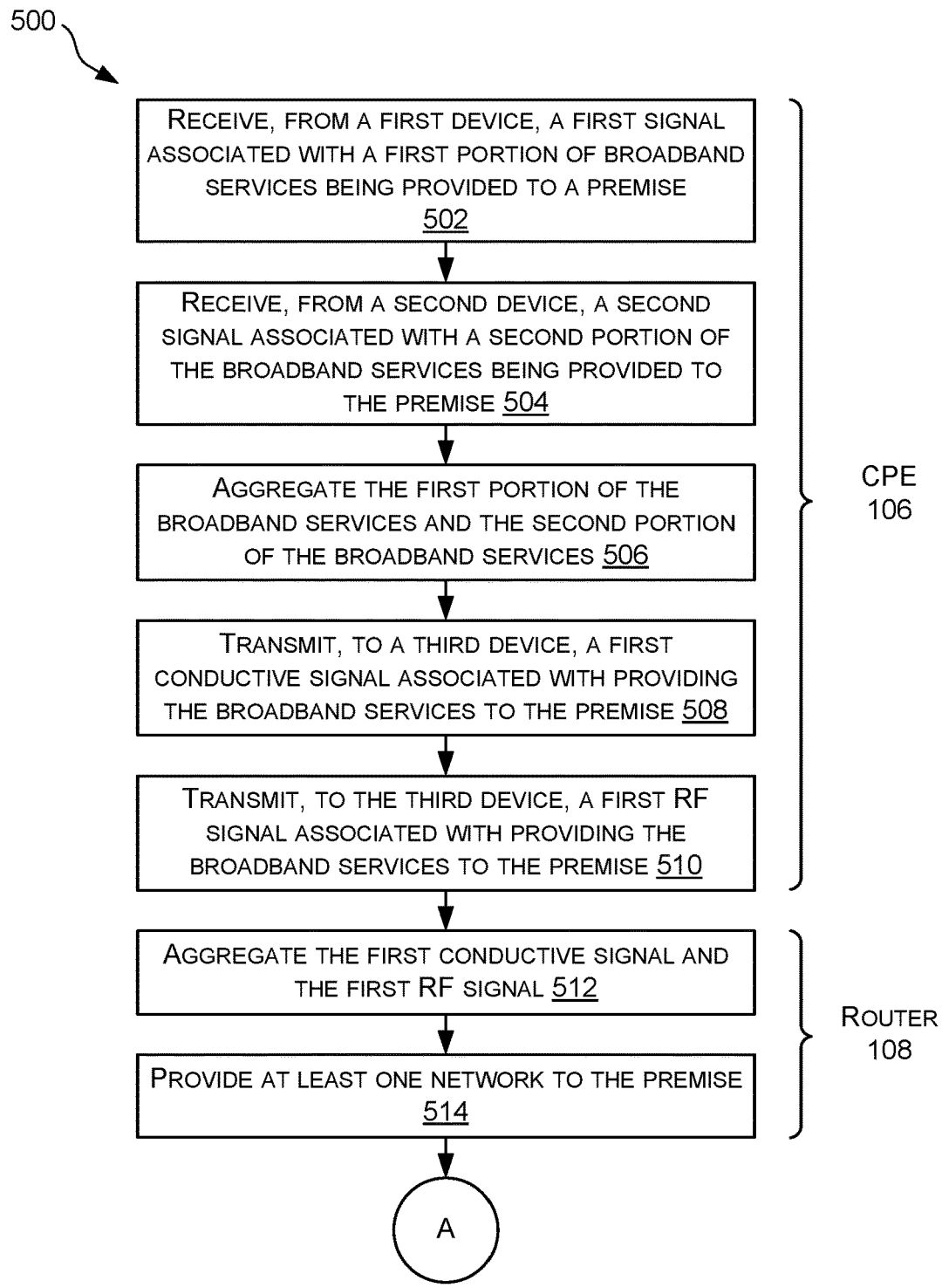
FIGS. 5 and 6 illustrate an example process for aggregating conductive signal and a radio frequency signals for extending broadband services to a premise, according to an example of the present disclosure.
Figure 6:
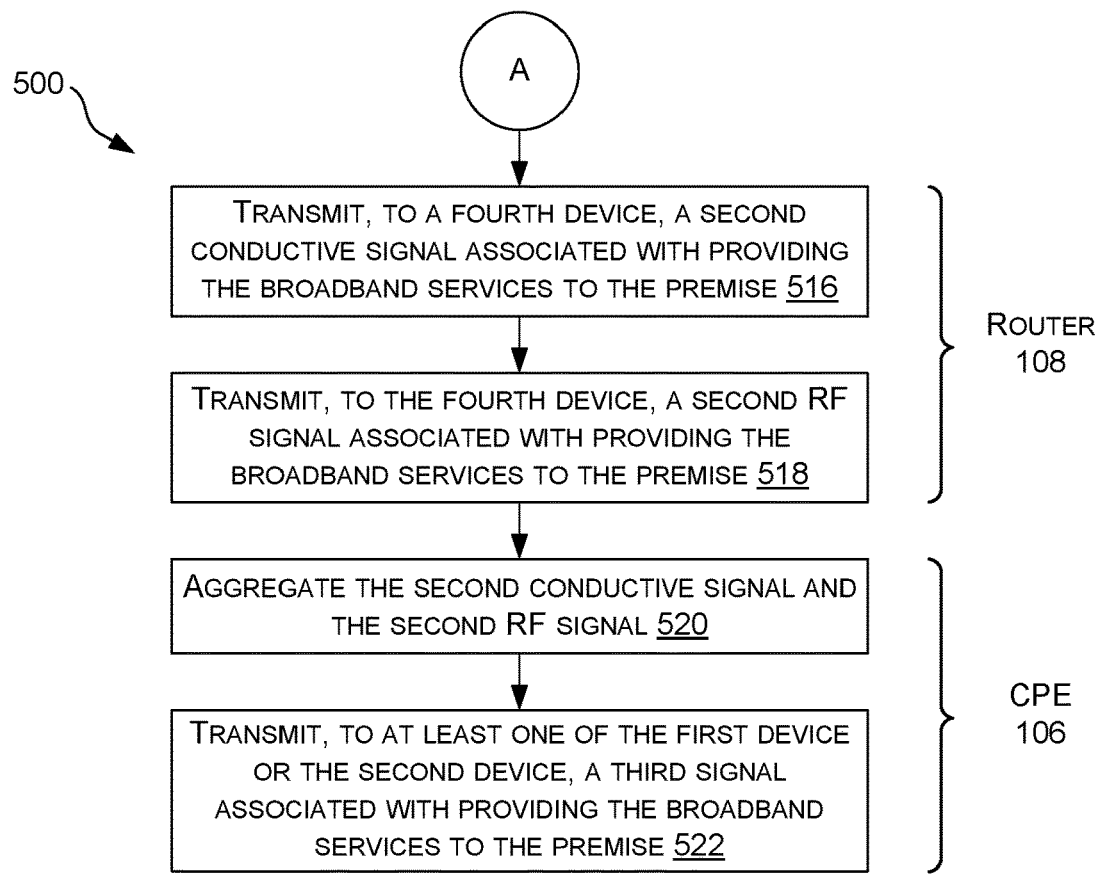

FIGS. 5 and 6 illustrate a process 500 related to increasing a throughput of broadband services to a premise. The process 500 described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the process 500 is described with reference to the environments, architectures and systems described in the examples herein, such as, for example those described with respect to FIGS. 1-4, although the process 500 may be implemented in a wide variety of other environments, architectures and systems.

In FIGS. 5 and 6, certain operations are shown and described as being performed by the CPE 106 or the router 108. However, although certain operations are shown and described as being performed by the CPE 106 or the router 108, it is to be understood that the CPE 106 and/or the router 108 may perform different steps than those illustrated.

At 502, the process 500 may include receiving, from a first device, a first signal associated with a first portion of broadband services to be provided to a premise. For example, the CPE 106 may receive the first signal from the base station radio device 104. The CPE 106 may wirelessly receive the first signal from the base station radio device 104. Ultimately, the base station radio device 104 communicatively connects to the WAN 116 provided by the NSP 114.

At 504, the process 500 may include receiving, from a second device, a second signal associated with a second portion of broadband services to be provided into the premise. For example, the CPE 106 may receive the second signal from a second device (e.g., switch, router, etc.) that provides an additional WAN. In some instances, the second signal may be associated with a 802.11 WAN, however, other internet protocols may be used. Additionally, although described as receiving the first signal and the second signal, the CPE 106 may only receive one of the first signal or the second signal for extending the broadband services into the premise 102. Furthermore, the CPE 106 may receive other signals from any number of other devices or sources (e.g., the remote devices 138) for increasing a throughput of broadband services at the premise 102.

At 506, the process 500 may include aggregating the first portion of the broadband services and the second portion of the broadband services. For example, upon receipt of the first signal and the second signal, the first aggregator component 134 of the CPE may aggregate the broadband services. For example, if the first signal provides 100 mbps and the second signal provides 25 mbps, the CPE 106 may deliver speeds of up to 125 mbps into the premise 102. In this manner, the CPE 106 aggregates the first signal and the second signal as a way to increase throughput into the premise 102. However, noted above, the CPE 106 may not aggregate signals (e.g., the CPE 106 may receive broadband services from a single device) or may aggregate more than two signals.

At 508, the process 500 may include transmitting, to a third device, a first conductive signal associated with providing the broadband services into the premise. For example, the CPE 106 (using the first BPL interface 122, the first antenna(s) 120, the first modem module 126, etc.) may transmit the first conductive signal to the router 108. In some instances, the first conductive signal is transmitted through the electrical wiring of the premise 102. That is, as the CPE 106 may communicatively connect to the electrical wiring of the premise 102, the first conductive signal may be transmitted over the electrical wiring of the premise 102. In some instances, the speed of broadband services provided into the premise 102 via the first conductive signal may be variable, or based on specifics of the premise 102.

At 510, the process 500 may include transmitting, to the third device, a first RF signal associated with providing the broadband services into the premise. For example, the CPE 106 (using the first antenna(s) 120, the first modem module 126, the first transceiver 130, etc.) may transmit the first RF signal to the router 108. In some instances, the speed of broadband services provided into the premise 102 via the first RF signal may be variable, or based on specifics of the premise 102.

At 512, the process 500 may include aggregating the first conductive signal and the first RF signal. For example, the router 108, or the second aggregator component 140, may aggregate the first conductive signal and the first RF signal. For example, if the first conductive signal provides 100 mbps and the first RF signal provides 25 mbps, the router 108 may provide the premise 102 with speeds of up to 125 mbps.

At 514, the process 500 may include providing at least one network to the premise. For example, the router 108 may broadcast, using the second antenna(s) 142, the LAN 206 to the premise 102 for extending the broadband services to the consumer device(s) 110. In some instances, the LAN 206 may be delivered wirelessly to the consumer device(s) 110, or via one or more wired connections (e.g., Ethernet).

From 514, the process 500 may proceed to "A", which is discussed in FIG. 6. At 516, the process 500 may include transmitting, to a fourth device, a second conductive signal associated with providing the broadband services into the premise. For example, the router 108 (using the second BPL interface 124, the second antenna(s) 142, the second modem module 128, etc.) may transmit the second conductive signal to the CPE 106. In some instances, the second conductive signal is transmitted through the electrical wiring of the premise 102.

At 518, the process 500 may include transmitting, to the fourth device, a second RF signal associated with providing the broadband services into the premise. For example, the router 108 (using the second antenna(s) 142, the second modem module 128, the second transceiver 132, etc.) may transmit the second RF signal to the CPE 106.

At 520, the process 500 may include aggregating the second conductive signal and the second RF signal. For example, the CPE 106, or the first aggregator component 134, may aggregate the second conductive signal and the second RF signal. In this sense, as the router 108 takes advantage of multiple connections with the CPE 106, after receiving the signals from the router 108 associated with providing broadband services into the premise 102, the CPE 106 may aggregate the signals.

At 520, the process 500 may include transmitting, to at least one of the first device or the second device, a third signal associated with providing the broadband services into the premise. For example, the CPE 106 may communicate with at least one of the base station radio device 104 or the remote devices 138 in order to provide the broadband services into the premise 102.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system, comprising:
a first device including:
a body configured to couple to an electric meter at a premise;
a first power module disposed within the body, the first power module configured to couple to electrical wiring at the premise;
a first antenna communicatively coupled to the first power module;
a first broadband over powerline (BPL) interface communicatively connected to the first power module and the first antenna;
a first transceiver communicatively connected to the first antenna;
one or more first processors; and
one or more first non-transitory computer readable media storing computer-executable instructions, that when executed by the one or more first processors, cause the first device to perform first operations comprising:
receiving, from a second device via the first antenna, data associated with providing broadband services into the premise,
sending, to a third device via the first BPL interface, a conductive signal over the electrical wiring of the premise, and
sending, to the third device via the first transceiver, a radio frequency (RF) signal; and
the third device, including:
a second power module configured to couple to the electrical wiring at the premise;
a second antenna communicatively coupled to the second power module;
a second BPL interface communicatively connected to the second power module and the second antenna;
a second transceiver communicatively connected to the second antenna;
one or more second processors; and
one or more second non-transitory computer readable media storing computer-executable instructions, that when executed by the one or more second processors, cause the third device to perform second operations comprising:
receiving, from the first device via the second BPL interface, the conductive signal,
receiving, from the first device via the second transceiver, the RF signal, and
aggregating the conductive signal and the RF signal to provide a local area network (LAN) into the premise.

2. The system of claim 1, wherein:
the second operations further comprise:
sending, to the first device via the second BPL interface, a second conductive signal over the electrical wiring of the premise, and
sending, to the first device via the second transceiver, a second RF signal; and
the first operations further comprise:
receiving, from the third device via the first BPL interface, the second conductive signal,
receiving, from the third device via the first transceiver, the second RF signal,
aggregating the second conductive signal and the second RF signal.

3. The system of claim 1, wherein:
the conductive signal is associated with a first frequency; the first operations further comprise sending, to the third device via the first transceiver, a second RF signal associated with a second frequency that is different than the first frequency; and the second operations further comprising aggregating the conductive signal, the RF signal, and the second RF signal to provide the LAN.

4. The system of claim 1, wherein the first operations further comprise:
receiving, from a fourth device, second data associated with providing the broadband services into the premise; and
aggregating the data and the second data to provide the broadband services into the premise.

5. The system of claim 1, wherein:
the conductive signal provides a first portion of the broadband services into the premise; and
the RF signal provides a second portion of the broadband services into the premise.

6. A system, comprising:
a consumer premise equipment (CPE) configured to couple to an electric meter at a premise, the CPE including:
one or more first antennas,
a first broadband over powerline (BPL) interface,
one or more first processors, and
first memory storing computer-executable instructions, that when executed by the one or more first processors, cause the CPE to perform first operations comprising:
receiving first data from a remote device,
sending, via the first BPL interface, a first portion of the first data over electrical wiring of the premise,
sending, via the one or more first antennas, a second portion of the first data;
receiving, via the first BPL interface, a first portion of second data,
receiving, via the one or more first antennas, a second portion of the second data,
aggregating the first portion of the second data and the second portion of the second data, and
a router including:
one or more second antennas,
a second BPL interface,
one or more second processors, and
second memory storing computer-executable instructions, that when executed by the one or more second processors, cause the router to perform second operations comprising:
receiving, via the second BPL interface, the first portion of the first data,
receiving, via the one or more second antennas, the second portion of the first data,
aggregating the first portion of the first data and the second portion of the first data to extend broadband services into the premise,
receiving the second data,
sending, via the second BPL interface, the first portion of the second data over electrical wiring of the premise, and
sending, via the one or more second antennas, the second portion of the data.

7. The system of claim 6, wherein the first operations further comprise:
receiving third data from a second remote device; and
aggregating the first data and the third data.

8. The system of claim 6, wherein:
the CPE is located externally to the premise; and
the router is located internally to the premise.

9. The system of claim 6, wherein:
the first portion of the first data sent by the first BPL interface represents a conductive signal sent to the router over the electrical wiring of the premise; and
the second portion of the first data sent by the one or more first antennas represents a radio frequency (RF) signal sent to the router.

10. The system of claim 6, wherein the router includes an aggregator component, the aggregator component being configured to aggregate the first portion of the first data and the second portion of the first data to generate at least one LAN to the premise.

11. The system of claim 6, wherein the CPE is configured to aggregate a plurality of wide area networks (WANs) to extend the broadband services to the premise.

12. The system of claim 6, wherein the first operations further comprise sending at least one of:
third data to the remote device, the third data representing at least a portion of the second data; or
fourth data to a second remote device, the fourth data representing at least a portion of the second data.

* * * * *